United States Patent [19]
Eagleson, Jr.

[11] 3,877,420
[45] Apr. 15, 1975

[54] ANIMAL HOUSING
[75] Inventor: John M. Eagleson, Jr., Kennebunk, Maine
[73] Assignee: The Baker Company, Inc., Sanford, Maine
[22] Filed: Nov. 15, 1973
[21] Appl. No.: 416,191

[52] U.S. Cl................................ 119/15; 119/17
[51] Int. Cl.............................. A01k 1/00
[58] Field of Search............ 119/15, 17, 18, 19, 21, 119/22, 37

[56] References Cited
UNITED STATES PATENTS
3,302,615  2/1967  Tietje.............................. 119/15
3,557,756  1/1971  Ramsey........................... 119/15

Primary Examiner—Hugh R. Chamblee

[57] ABSTRACT

A controlled environment animal housing system having means to establish a laminar air flow downward through a housing assembly, an air vent to establish an inward flow of air through a housing access opening, and a filter to treat substantially all the air passed through the housing area or vented from the system.

12 Claims, 6 Drawing Figures

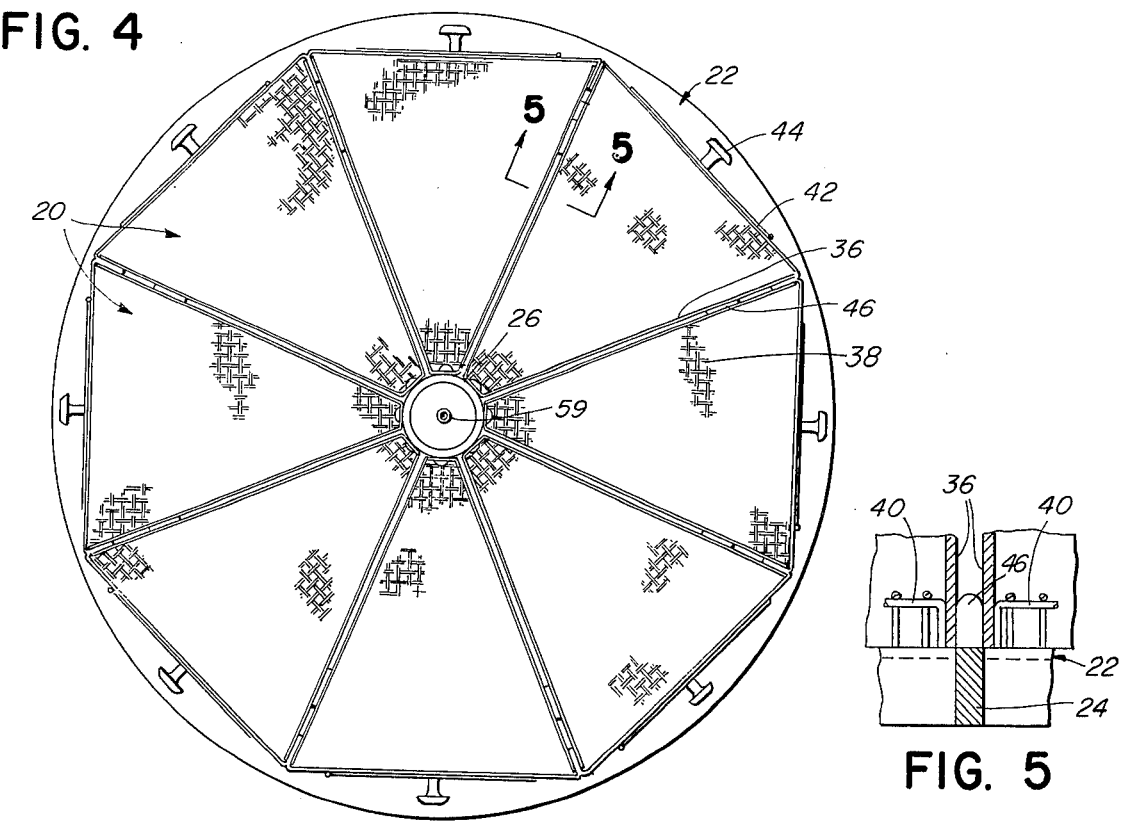
FIG. 4
FIG. 5
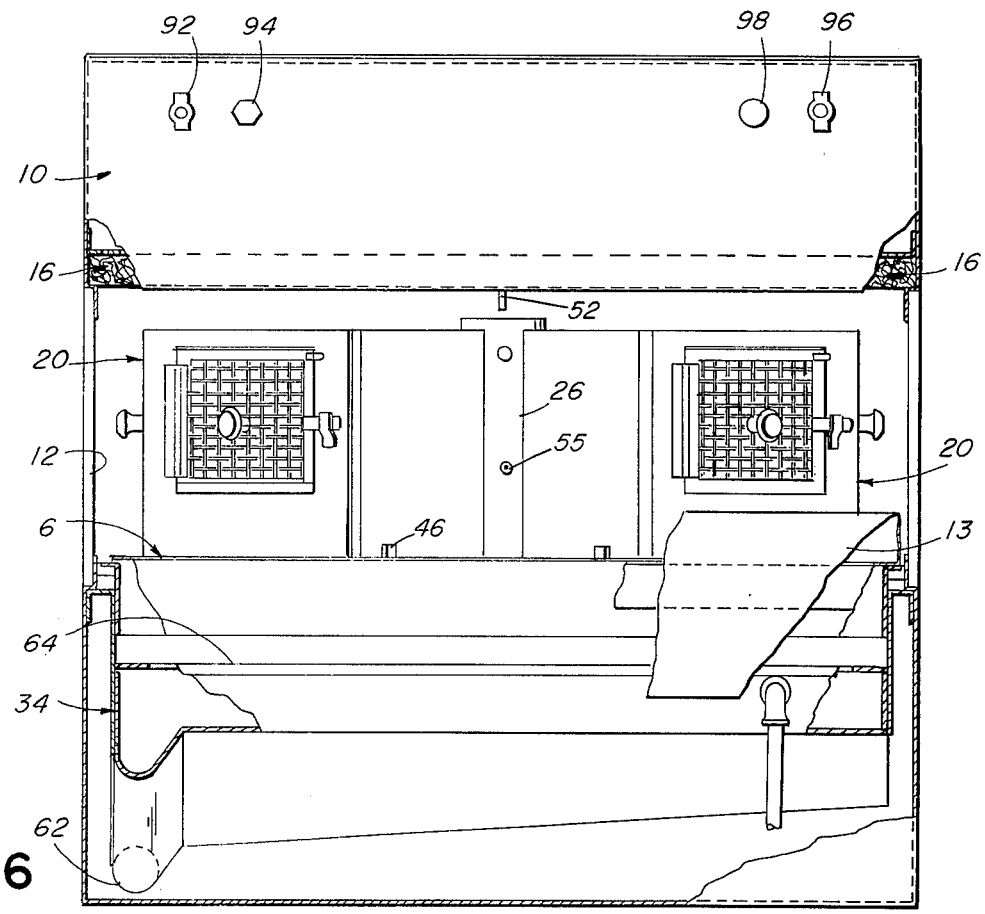
FIG. 6

//3,877,420

ANIMAL HOUSING

BACKGROUND

1. Field of the Invention

This invention pertains to animal housings, and more particularly to a system for maintaining a controlled environment in and about an animal housing.

2. Description of the Prior Art

Heretofore, controlled environment animal housings have been limited in the range of possibilities offered for working with, observing, and maintaining stable environmental conditions for laboratory animals. For example, in one type of housing system a laminar flow of filtered air is projected outwardly through a number of cages from an interior air plenum and filter assembly, while this system offers considerable advantages in maintaining a clean atmosphere within the cages to facilitate the raising of specific pathogen-free animals, the air within the cages is continuously exhausted to the outside and can contaminate the working area if the animals are infected. Another type of housing system overcomes the infection hazard by locating the cages inside an air-tight enclosure and circulating air between the cages and a filter device. This latter system prevents contaminated air from flowing either to or from the housing area, but has the disadvantage of isolating the animals within the enclosure so that the cages must be exposed to the outside atmosphere and the controlled environment sacrificed before the animals can be handled.

In order to have a reliable capability for both handling animals and preventing contamination of both the housing and work environments, it has generally been necessary to employ two separate housing systems, resulting in excess expense, duplication of facilities, and inefficient utilization of space. There is accordingly a considerable need for a housing system that achieves all of the above capabilities in a single, multi-purpose unit.

SUMMARY

In view of the above-stated considerations, it is an object of the present invention to provide a novel, multi-purpose animal housing system that maintains a controlled environment for animals housed therein. Another object is the provision of a controlled environment animal housing system that protects the exterior work area from contamination originating from within the system. A further object is the provision of a novel animal housing system having means to prevent the movement of contaminants either into or out of the system, while at the same time providing access to the interior of the system for handling of animals therein. Still another object is the provision of such a system, in which the housing space is efficiently utilized to enhance observation of and accessibility to animals housed within.

In the accomplishment of these and other objects, an animal housing system according to the invention is provided with a housing assembly that is permeable to a vertical air flow. The assembly is situated inside an enclosure and set back from an access opening formed in the front wall thereof, through which the animals may be reached for handling. A blower means is mounted in the enclosure to suck air downwardly through the housing assembly in a substantially laminar flow, and produces a blown air output that is directed within the enclosure to a space above the housing assembly. Part of the blower output is vented from the enclosure through an exhaust, thereby establishing an inward replenishing flow of air through the access opening that prevents any outward migration of contaminants from the housing assembly. A filter means, positioned in the path of the blower output, filters both the air delivered to the housing assembly and the air that is vented from the system.

An air distribution means above the housing assembly directs the downward air flow to the space adjacent the access opening as well as through the housing assembly, thereby deflecting the air entering through the access opening and causing it to bypass the housing assembly. Any leakage of unfiltered air from a plenum established between the blower and the filter is rendered harmless by enclosing the blower in a chamber which also forms a boundary for that portion of the plenum not in direct contact with the blower or filter. Leaks are captured within the chamber anad returned to the plenum, air circulation between the housing assembly and the blower being maintained through an air passageway connecting the chamber and the underside of the housing assembly.

In a particular embodiment, the housing assembly comprises a plurality of cages carried on an open-bottomed turntable. A perforated platform is provided with turntable receiver means set in an opening to rotatably support the housing assembly in alignment with the access opening, the platform being slideable in and out of the enclosure to facilitate maintenenace. The cages are provided with doors to enable handling of animals therein by reaching through the access opening and into a cage. The turntable hub comprises a drinking reservoir and is provided with dispensing means to deliver liquid to the cages.

Other objects, features and advantages of the invention will be seen from the following detailed description of a particular embodiment thereof, in conjunction with the drawings in which:

FIG. 4 is a view taken along line 4—4 of FIG. 3;

FIG. 5 is a view taken along line 5—5 of FIG. 4; and

FIG. 6 is a partially sectional view in front elevation of the housing system.

DETAILED DESCRIPTION OF A PARTICULAR EMBODIMENT

Figure 1:
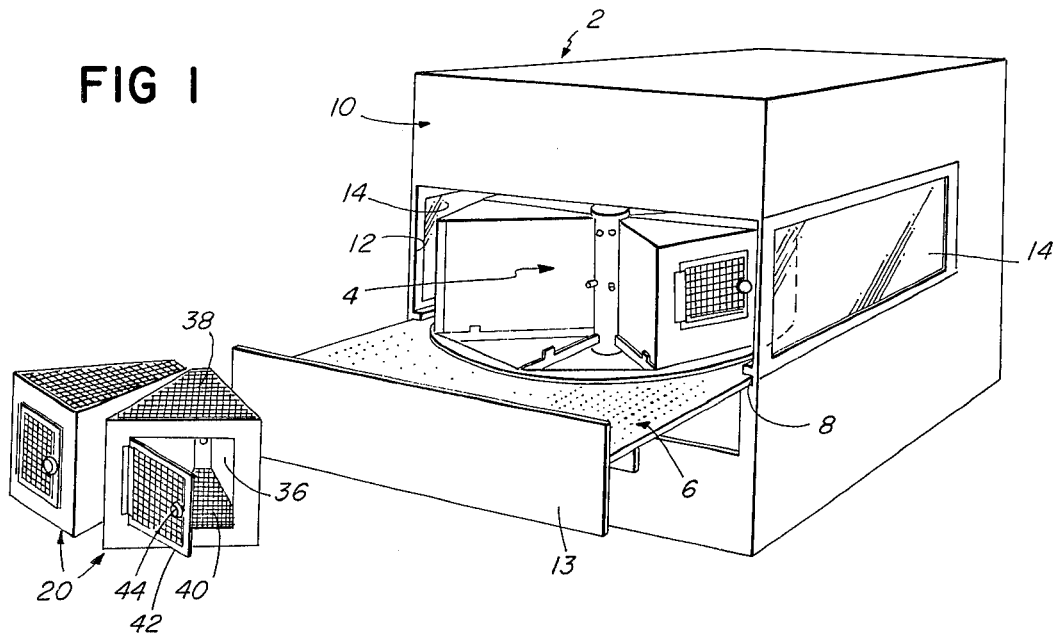
FIG. 1 is a perspective view of an animal housing system constructed in accordance with the invention, with a housing assembly shown partially withdrawn from the system enclosure.

Referring first to FIG. 1, an animal housing system is shown with its operative elements contained within a metal cabinet enclosure 2. A housing assembly generally designated by the numerals 4 is carried within the cabinet 2 on a perforated platform 6, the platform 6 being slideable in and out of the enclosure on guide rails 8 to facilitate maintenance and cleaning of the interior components. The central portion of the front cabinet wall 10 has an opening 12 sufficiently large for the housing assembly apparatus to be withdrawn from the cabinet 2 when the system is not in operation, the primary purpose of opening 12 however being to provide access to the interior of the cabinet 2 for handling animals when the system is operating. A lengthwise flange 13 at the front end of platform 6 restricts the size of the opening 12 when the system is in operation, and also provides a grip for sliding the platform 6 in and out. Glass view panels 14 are provided on either side of the cabinet 2 for observation of animals therein.

Figure 2:
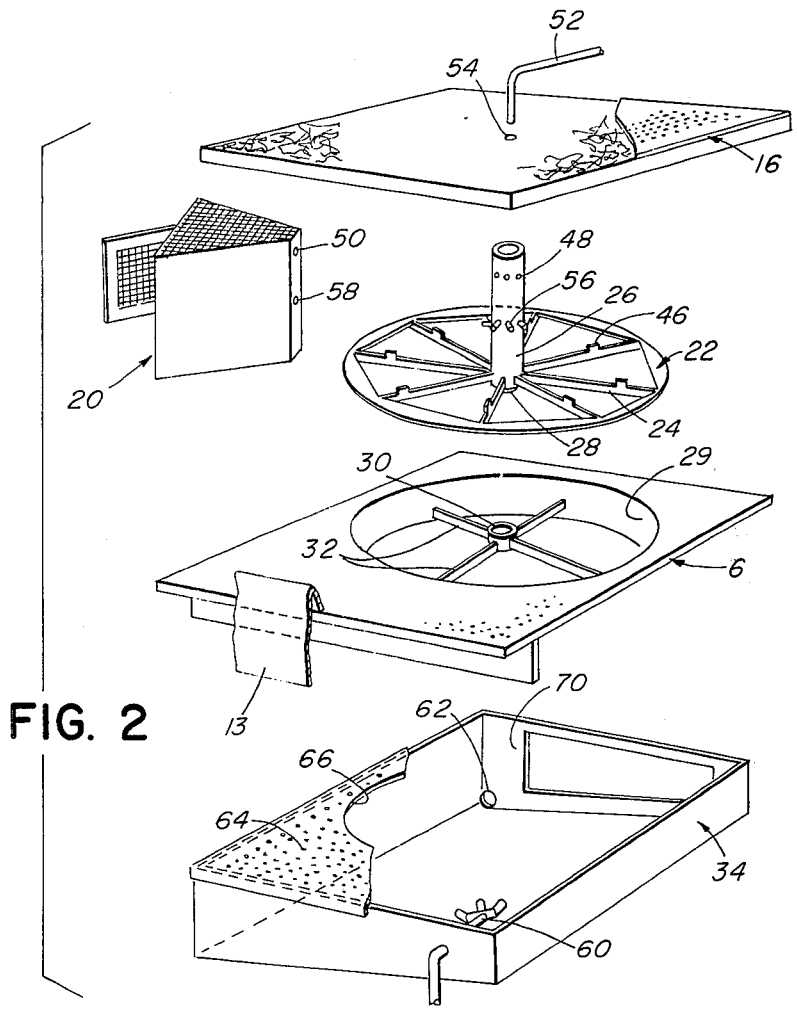
FIG. 2 is an exploded view showing various components of the system.
Figure 3:
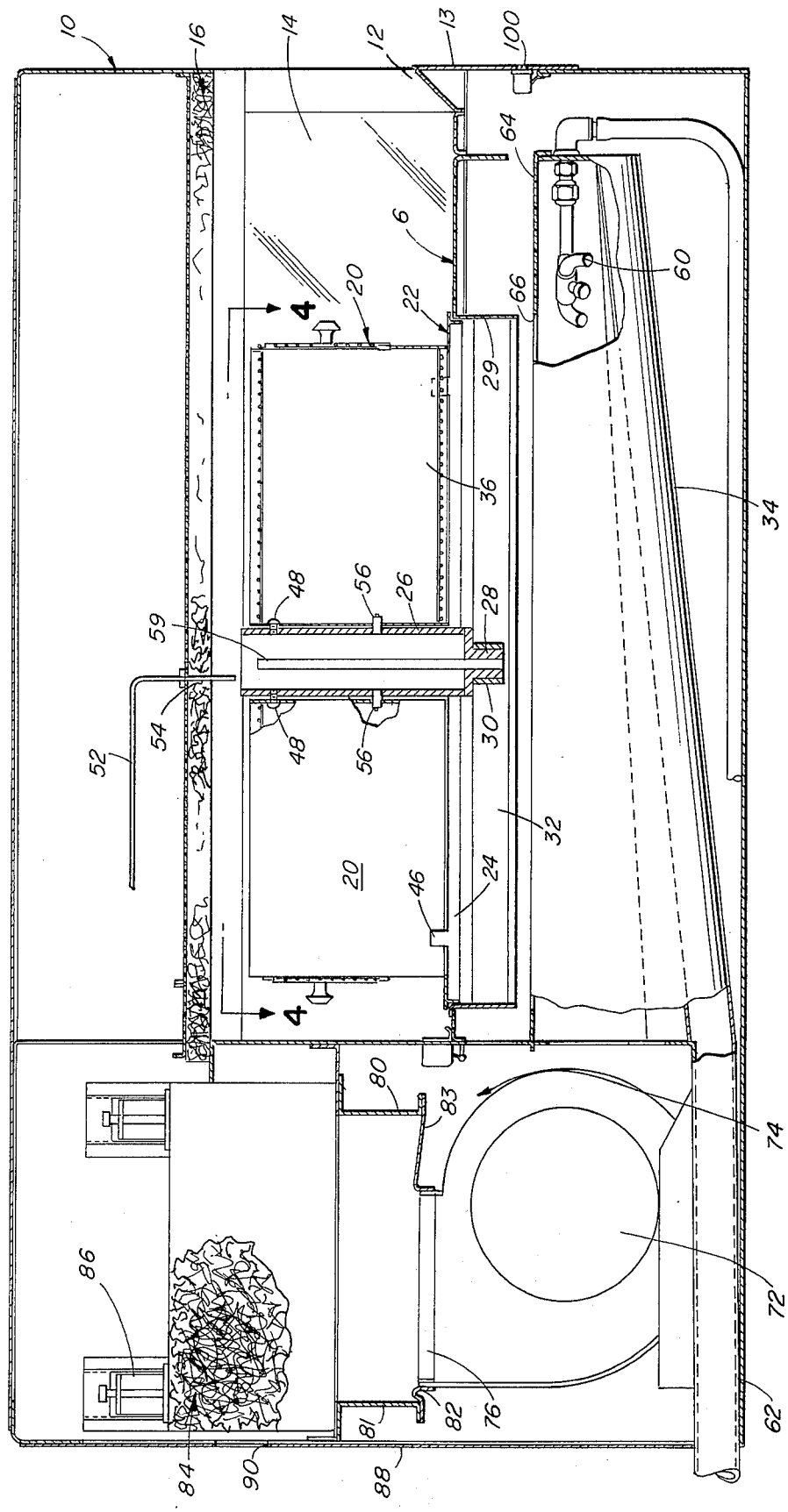
FIG. 3 is a partially sectional view in side elevation of the housing system.

Referring now to FIGS. 1–3, the principal components of the system include an air diffuser 16, and an open-bottomed turntable 18 for supporting a plurality of individual housing units such as cages 20, the turntable 18 having a rim 22, for supporting the front edges of cages 20, spokes 24, and an elongated tubular hub 26. A round mounting bracket 28, generally T-shaped in cross-section, closes the bottom of hub 26. The slideable platform 6 includes an opening 29 therein of sufficient size to accomodate the turntable 18, with a tubular receiver 30 for the hub mounting bracket 28 carried at the center of the platform opening 29 by a number of struts 32. A drop an 34 below the platform 6 catches droppings from the housing assembly.

Cages 20 are generally wedge-shaped with metal side walls 36 and top and bottom walls 38 and 40 formed from wire mesh, the mesh perforations being small enough to satisfactorily support the housed animals but large enough so that the cages are substantially permeable to vertical air flows. Each cage is provided with an outward facing, spring-closed door 42 having a handle 44 for conveniently opening the door to handle the animals. The cages 20 are normally mounted symmetrically about the upper surface of turntable 18, an upstanding tab 46 on each turntable spoke 24 serving to space adjacent cages apart. A plurality of outward extending, shaped posts 48 are positioned around the periphery of the hub 26 to engage keyhole slots 50 at the back of the cages. Individual cages may be lifted and pulled outwardly for removal.

The tubular turntable hub 26 also functions as a drinking reservoir, and is filled by a water supply pipe 52 mounted in the upper region of the cabinet 2 above a small opening 54 in air diffuser 16. Water can be fed to the pipe 52 from an outside water supply or from a water bottle, preferably placed atop the cabinet 2, if treated water is desired. Lick spouts 56 extend out from the hub 26 through openings 58 at the back of the cages to dispense water to animals therein. An overflow pipe 59 directs excess water through the hub mounting bracket 28 to the drop pan 34 to prevent spills into the cage area.

The bottom of drop pan 34 is sloped back and to the side, with a liquid spray head assembly 60 positioned above its uppermost portion for periodic flushing of collected material out through a drain pipe 62. A drop pan cover 64 permits air flow down into the pan by means of a plurality of perforations distributed across its front region, and an opening 66 in registry with the housing assembly. An opening 68 in the rear drop pan wall 70 also serves as an air passageway in the air distribution mechanism described below.

An air blower 72 is housed within a chamber 74 at the rear of the cabinet 2 to suck in air from the housing assembly area through the drop pan opening 68. The blower output orifice 76 directs a blown air output into a plenum 78 that is separated from the chamber 74 by walls 80, 81, 82 and 83. A filter 84 of the high efficiency particulate arrestant (H.E.P.A.) type, designed to remove 99.99% of airborne particles .3 microns or greater in diameter, overlies the top of plenum 78 and is held tightly thereagainst by mounting clamps 86. The filter 84 is spaced slightly away from the rear cabinet wall 88, an exhaust opening 90 being provided in the rear wall 88 to vent a desired quantity of filtered air out of the cabinet 2.

The upper region of cabinet 2 above the filter 84 and air diffuser 16 is substantially open, providing a duct for the flow of filtered air up from filter 84, forward through the cabinet 2, and downward towards the housing assembly. Air diffuser 16 is designed to form a substantially laminar downward air flow distributed across substantially the entire housing assembly and access area, i.e., from the rear of the housing assembly to the access opening 12 in the front cabinet wall 10. When the blower is turned on a first air flow path is established down through the cages 20, turntable 18, platform opening 29, drop pan cover opening 66, and back through drop pan opening 68 to the intake of blower 72. A second air flow path extends down through the space between the housing assembly and the access opening 12, through the perforations in platform 6 and drop pan cover 66, and back to merge with the first air flow.

Various operating controls are mounted at the front of the cabinet 2, as shown in FIG. 6. Switch 92 turns the blower 72 on and off. Dial 94 controls the blower speed, and may be adjusted periodically to compensate for a gradual accumulation of dirt in the filter 84 and thereby keep the airflow velocities inside the cabinet 2 within a desired range. Switch 96 controls the water supply, while a warning light 98 is energized by a microswitch when the housing assembly is not fully positioned back in the cabinet, the microswitch also serving to turn off the water supply to prevent accidental dripping into the cages 20.

The system is in operating position with platform 6 pushed all the way in, a pair of slotted fasteners 100 on the cabinet front wall 10 locking the drawer in place. When the blower 72 is turned on, air is blown into the plenum 78, through the filter 84, to the top of diffuser 16, and then sucked down through the housing assembly and access along the paths described above. All of the air passing through the cages 20 has been first treated by filter 78, thereby maintaining an environment inside the cages that is free from outside contaminants, and making possible the successful raising of specific pathogen-free animals or the like.

Some of the air blown through filter 84 is vented through exhaust opening 90, creating a partial vacuum within the cabinet 2 that induces an inflow of replenishing air through the access opening 12. This inflow consists of untreated air that may contain elements harmful to the controlled environment within the housing assembly. The untreated air, however, is deflected downward by the air flow coming from diffuser 16 and directed down through the perforations, in the forward portion of platform 6, bypassing the housing assembly. The air is then sucked into blower 72 and forced through the filter 84, where the unwanted particulate matter is removed. The controlled environment within the housing assembly is thereby left undisturbed, while only filtered air is vented out from the system through exhaust 90 to the surrounding area. At the same time an operator can easily reach in through the access opening 12, rotate the turntable 18 until a desired cage is aligned with the access opening, and open the cage door 42 to handle the animals inside.

In order to maintain a laminar flow through the housing assembly, the downward air flow rate should be kept within the range of about 20 to 40 feet per minute, and preferably aboout 25 to 30 feet per minute. It has been found that with the above air flow rates the inflow rate of air through access opening 12 can be made sufficiently great to prevent any appreciable migration of air from the housing assembly out through the access opening 12, and yet low enough so that the inflowing air will be deflected down through the perforations of platform 6 before coming close to the housing assembly, if the size of exhaust opening 90 is such that the inflow rate through the opening 12 is in the range of about 50 to 100 feet per minute, and preferably about 75 feet per minute. At this velocity the inflowing air goes only a few inches into the cabinet 2 before it passes down through the platform 6. While animals may conveniently be removed from their cages for handling when the system is operating, in which case platform 6 can serve as a work surface, the animals should be kept at least a few inches in from the access opening 12 to avoid contamination from the unfiltered inward air flow.

The efficiency of the system is enhanced if the downward air flow rate through the housing assembly is checked periodically. If the flow rate falls below 25 feet per minute the blower 72 speed should be increased by turning the speed control dial 94 until the proper velocity is reached. If the flow rate falls to 20 feet per minute or less with the blower 72 set at full spped, the filter 84 should be replaced.

With the system operating, the only unfiltered air inside the cabinet 2 that is not subject to suction from blower 72 for delivery to the filter 84 is the air already within plenum 78. Any air leaking from the plenum 78, however, emerges into the blower chamber 74 and is immediately sucked back into the blower and redelivered to the plenum, thereby ensuring that no unfiltered air reaches either the housing assembly or the working area outside the cabinet 2.

With the above system the housing assembly and animals therein are effectively insulated from gaseous flows either to or from the outside atmosphere, while at the same time the animals are readily accessible for handling without disturbing the controlled environment. The single system may therefore be used to protect outside personnel from infected animals, to provide a controlled inside environment with a handling capability, or to perform both functions simultaneously.

While a particular embodiment of the invention has been shown and described, there are modifications thereof which will be apprent to those skilled in the art, and therefore it is not intended that the invention be limited to the disclosed embodiment or the details thereof, and departures may be made therefrom within the spirit and scope of the invention as defined in the claims.

I claim:

1. A controlled environment animal housing system, comprising:
    an enclosure having an air passageway in a wall thereof,
    housing means permeable to vertical air flow carried within said enclosure and set back from said air passageway,
    blower means mounted in said enclosure to suck air downwardly through said housing means, said bloweer means having a blown air output directed within said enclosure to a space above said housing means for producing a vertical downward air flow through and past said housing means.
    exhaust means adapted to vent from said enclosure some of the blown air output of said blower means, and thereby establish an inward replenishing flow of air through said air passageway, said vertical downward air flow and said set back of said housing means cooperating to cause said inward replenishing flow of air to by-pass said housing means, and
    filter means positioned in the blown air output path of said blower means to filter the air introduced into said housing means and vented from said enclosure.

2. The animal housing system of claim 1, said blower means being mounted within a chamber in said enclosure, an air passageway communicating between said chamber and the underside of said housing means, and further including a plenum bounded by said chamber, said blower output orifice, and said filter means, any unfiltered air escaping from said plenum being captured within said chamber by the intake suction of said blower means and returned to said plenum.

3. The animal housing system of claim 1, said housing means comprising a multi-unit assembly and including adjustable unit mounting means adapted to present desired ones of said units in alignment with said access opening.

4. The animal housing system of claim 3, including a generally open-bottomed turntable support assembly to carry said multi-unit housing means in generally horizontal alignment with said enclosure access opening, said housing units comprising generally wedge-shaped cages symmetrically distributable about said support assembly, the outer peripheral wall of each of said cages being provided with a door enabling access to the interior of said cages, the interior of each of said cages being accessible from said access opening by rotation of said turntable to an appropriate position.

5. The animal housing system of claim 1, including air distribution means mounted above said housing means to distribute blown air from said blower means in a downward substantially laminar air flow that passes adjacent to said access opening the through said housing means.

6. The animal housing system of claim 5, including a perforated mounting platform for said housing means disposed below said access opening and spanning the space between said housing means and said enclosure wall, said platform including an air opening in registry with said housing means, and housing means mounting structure set in said opening.

7. A controlled environment animal housing system, comprising:
    an outer enclosure having an access opening in the front wall thereof,
    a housing assembly permeable to vertical air flow carried within said enclosure in alignment with said access opening, said housing assembly having a perforated lower wall, means for mounting said housing assembly, including a perforated support platform having an opening therein approximately at least as large in area as the lower housing assembly wall, and means cooperating with said platform to mount said housing assembly in registry with said opening, blower means having an output orifice and mounted in said enclosure to suck air downwardly through said housing assembly, exhaust means adapted to vent from said enclosure some of the blown air output of said blower means and thereby establish an inward replenishing flow of air through said access opening, said exhaust means adapted to vent air at a rate at least as great as the rate necessary to inhibit an outward flow of air through said access opening but less than the rate necessary for the inward flow of air established through said access opening to reach said housing assembly, air distribution means disposed above said housing assembly and communicating with said blower output orifice through an air duct, said air distribution means adapted to direct air received from said blower means in a downward substantially laminar flow encompassing said housing assembly and extending substantially to said access opening, and filter means in the blown air output path of said blower means to filter the air vented from said enclosure and the air delivered to said air distribution means, whereby said housing assembly is insulated from unfiltered gaseous communication with the outside atmosphere and animals housed therein may be handled by reaching in through said access opening.

8. The animal housing system of claim 7, including an open-bottomed housing assembly support turntable having a centrally disposed hub, and hub receiver means carried in said support platform opening, said housing assembly comprising a plurality of cages carried on said turntable and rotatable thereby for alignment with said access opening.

9. The animal housing system of claim 8, said hub comprising an elongated, close-bottomed tube, and including liquid dispensing means extending from said tube to each of said cages, said tube forming a reservoir for a supply for drinking liquid deliverable through said dispensing means to said cages.

10. The animal housing system of claim 8, said support platform being carried in said enclosure on a set of slide rails, said housing assembly being at least partially withdrawable from said enclosure by sliding said platform out on said rails.

11. The animal housing system of claim 7, adapted to produce a downward laminar air flow rate of from about 20 to about 40 feet per minute, and an inward air flow rate through said access opening of from about 50 to about 100 feet per minute.

12. The animal housing system of claim 11, adapted to produce a downward laminar air flow rate of from about 25 to about 30 feet per minute, and an inward air flow rate through said access opening of about 75 feet per minute.

* * * * *